United States Patent [19]

Matthelié

[11] Patent Number: 4,574,598
[45] Date of Patent: Mar. 11, 1986

[54] DEVICE FOR MEASURING THE LENGTH OF YARN ABSORBED BY A TEXTILE MACHINE

[75] Inventor: Jean-Pierre Matthelié, La Chapelle Saint-Luc, France

[73] Assignees: Institut Textile de France, France; Centexbel, Belgium

[21] Appl. No.: 746,560

[22] Filed: Jun. 19, 1985

[30] Foreign Application Priority Data

Jun. 26, 1984 [FR] France ............................. 84 10068

[51] Int. Cl.⁴ ............................................ D05B 15/44
[52] U.S. Cl. .................................. 66/146; 66/126 R; 33/127
[58] Field of Search ..................... 66/125, 126 R, 146, 66/132; 33/127, 129

[56] References Cited

U.S. PATENT DOCUMENTS

| | | | |
|---|---|---|---|
| 3,550,400 | 12/1970 | Peat et al. | 66/125 X |
| 3,746,226 | 7/1973 | Leclercq | 66/146 X |
| 3,780,541 | 12/1973 | Haynes | 66/125 R |
| 4,523,440 | 6/1985 | Voisin et al. | 66/146 |

*Primary Examiner*—Ronald Feldbaum
*Attorney, Agent, or Firm*—Shenier & O'Connor

[57] ABSTRACT

This invention relates to an improved device for measuring the length of yarn absorbed by a textile machine, comprising in known manner a rotating member driven by the yarn during displacement thereof. It presents three fixed guides over which the yarn passes and which are positioned near the rotating member so that the yarn is in contact with the rotating member along two substantially equal arcs of low value, for example from 20° to 50° and advantageously 30°. The device is more particularly applicable to measuring the length of yarn absorbed per stitch on flat knitting machines.

3 Claims, 4 Drawing Figures

DEVICE FOR MEASURING THE LENGTH OF YARN ABSORBED BY A TEXTILE MACHINE

The present invention relates to a device for measuring the length of yarn absorbed by a textile machine, of the type comprising a rotating member driven by the yarn during its displacement. It is more particularly applied to measuring the length of yarn absorbed per stitch (hereinafter referred to as length of yarn) during knitting on machines with intermittent feed of the yarn, such as flat knitting machines.

In the manufacture of textile articles, the constancy of the length of yarn absorbed by the machine is indispensible for obtaining perfect reproducibility during the whole manufacture. For example, a variation in the length of yarn on a flat knitting machine correlatively brings about a variation in the dimensions of the panel knitted. Now, for the same adjustment of the knitting machine, the length of yarn may vary during knitting in the case of irregularity of the yarn itself, particularly in the case of fluctuation of the coefficient of friction of the yarn. It is therefore important to measure the length of yarn in order to be able to correct the variations thereof, either by adjusting the members of the knitting machine or by effecting regulation by action of certain members to correct the variations observed. This principle of regulation is known, particularly by French Pat. No. 77 25038, which recommends measuring the length of knitted yarn by passing the yarn around a rotating member so that the contact is without slip: the length of yarn may therefore be measured by the speed of rotation of the rotating member. French Pat. No. 69 07568 also teaches a process and a device for measuring the length of yarn absorbed on knitting machines employing a rotating member driven by the yarn; in this Patent, the rotating member is a permanently illuminated disc provided with reflecting sectors alternating with sectors which are much less reflecting, and the length of yarn is measured by counting the pulses coming from a sensor translating the variations of illumination into electrical pulses.

With all the devices which comprise a rotating member, measurement of the length of yarn can be effected validly only when the rotating member moves at the same speed as the yarn, and therefore only when there is no slip between the yarn and the rotating member. This is obtained either with the aid of means preventing slip, as in French Pat. No. 77 25038 and consequently modifying the tension of the yarn, or by effecting measurement only after a sufficient time for the rotating member to have attained the speed of displacement of the yarn after the phase of start up and therefore of slip. These solutions are not entirely satisfactory, particularly when it is desired to measure the length of yarn during knitting on machines with intermittent feed of the yarn, such as flat knitting machines. In fact, in the latter case, the yarn is subjected to considerable jerks during right-to-left and left-to-right displacements of the carriage: the speed of the yarn is zero at the beginning and end of strokes, out of the knitting zone, and attains values of several meters per second. If a rotating means is used without particular means for preventing slip, the slip is such that there is materially no time to effect measurement of the length of yarn during a stroke of the carriage. If means are used for preventing slip, taking into account the efforts undergone by the yarn when the rotating member is set in rotation, the yarn breaks at the selvedge, generally more frequently on the side where the knitting machine is supplied with yarn than on the other side.

An improved device for measuring the length of yarn absorbed by a textile machine which avoids these drawbacks and which is particularly applicable to machines with intermittent feed of the yarn, has now been found, and this is the subject matter of the present invention. In fact, the device avoids breaks of the yarn on the selvedge, whilst allowing an extremely rapid drive of the rotating member by the yarn. This device is of the type comprising a rotating member driven by the yarn during displacement thereof; it is characterized in that it comprises three fixed guides over which the yarn passes, positioned in the vicinity of the rotating member so that the yarn is in contact with the rotating member along two substantially equal arcs of low value. Each of the arcs of contact between the yarn and the rotating member is preferably between 20° and 50°, and advantageously 30°.

In the device of the invention, the majority of the efforts occurring during the movement of the yarn are absorbed by the intermediate fixed guide and not by the shaft of the rotating member, this improving the life of this shaft, and making it possible to adopt a shaft of small diameter, this limiting the inertia of the rotating member.

When the measuring device is mounted permanently on the knitting machine, it is preferably implanted between the tension device which lies on the path of the yarn after the supply package and the yarn-return which returns the yarn at the end of strokes of the carriage.

The invention will be more readily understood on reading the following description of a preferred embodiment of the device in its application to measuring the length of yarn on a flat knitting machine, with reference to the accompanying drawings, in which.

Figure 1:
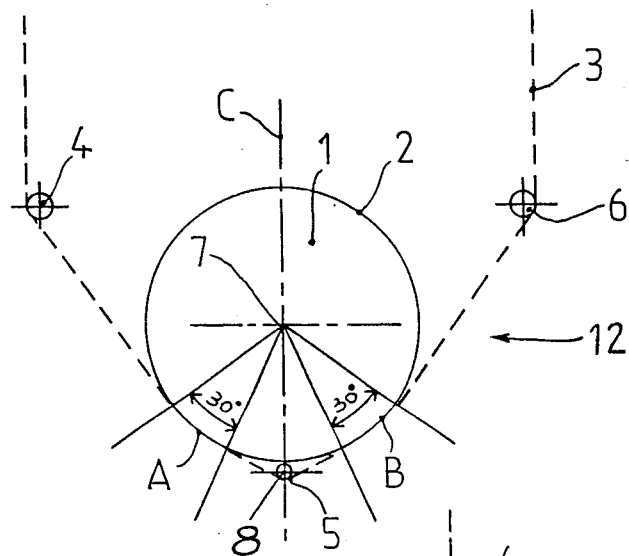
FIGS. 1, 2 and 3 are schematic views of the device, which differ from one another by three different paths of the yarn.

Referring now to the drawings, the rotating member 1 of the device 12 for measuring the length of yarn is a caster with a mass of 1.78 g and a diameter of 24.91 mm; the surface 2 in contact with the yarn 3 is provided with a positive - non-smooth - coating of acrylonitrile. In the immediate proximity of the caster 1 are placed three fixed guides 4, 5, 6 over which the yarn 3 passes and whose axes are parallel to axis 7 of the caster 1. The guides 4 and 6 have the same dimensions; their diameter is of the order of 2 mm; the guide 5, located between the two guides 4 and 6, has a smaller diameter, of the order of 1.5 mm. These three guides are placed with respect to the caster 1 and one with respect to the other so that yarn 3 is in contact with caster 1 along two arcs A and B which are substantially equal and of low value, 30° each in the Figures. To this end, the guide 5 must be relatively close to caster 1, for example from 0.5 to 1 mm, and the two guides 4 and 6 must be placed on either side of the plane C passing through the axes of caster 1 and guide 5, 7 and 8 respectively, so that path adopted by the yarn between guides 4 and 6 is symmetrical with respect to plane C. It is this arrangement which ensures the most reliable operation for the device.

Figure 2:
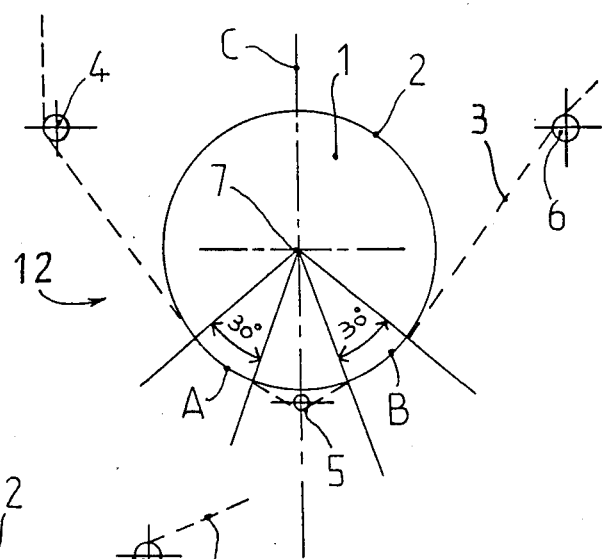
Figure 3:
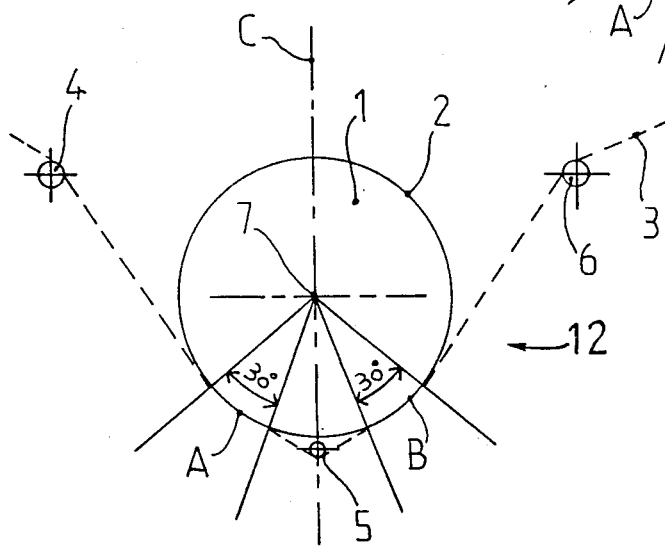
Figure 4:
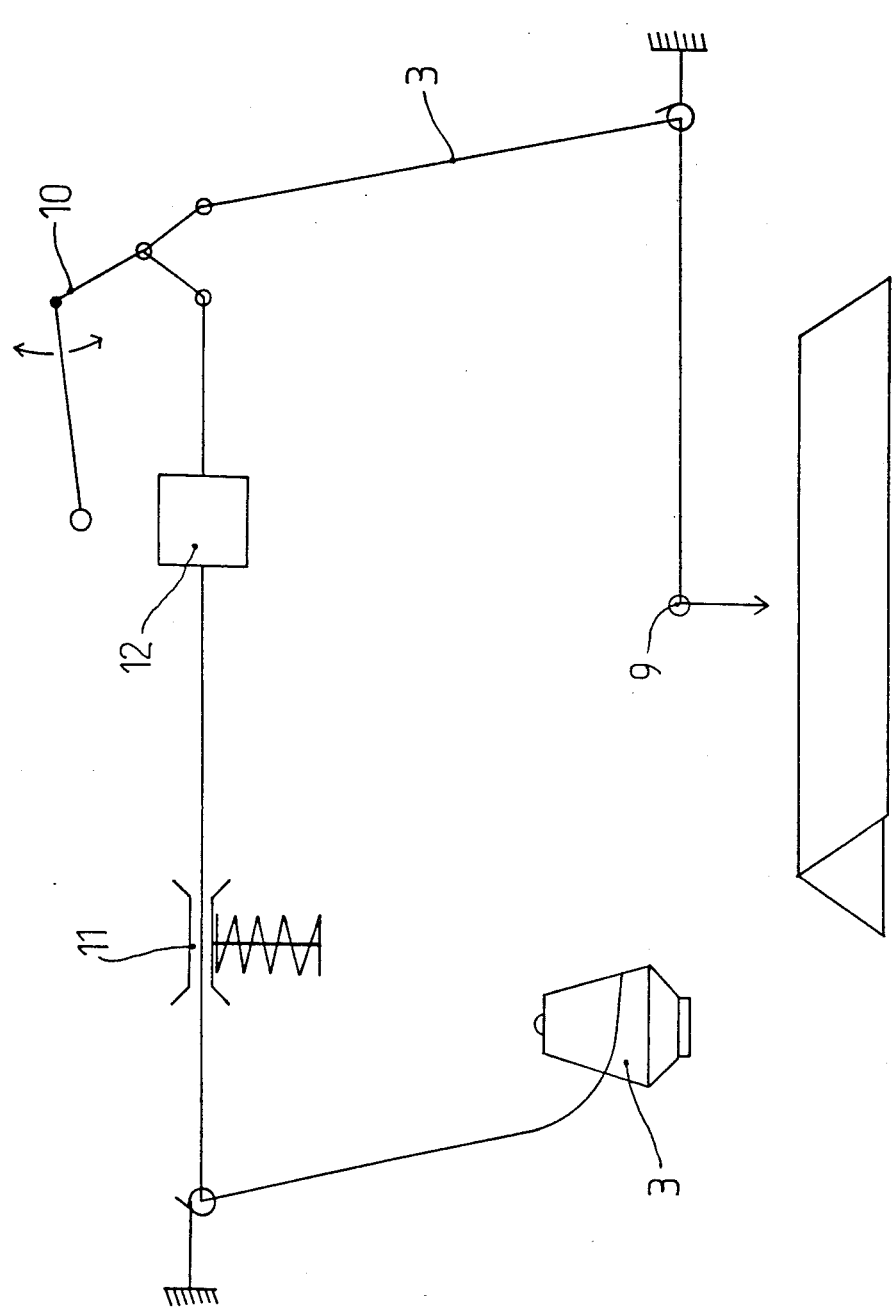
FIG. 4 is a schematic view of the path of the yarn in the flat knitting machine.

Guides 4 and 6 are located at distances from caster 1 which are a function of the path of yarn 3. In the embodiment illustrated in FIG. 1, yarn 3 follows a path which is totally outside the three guides and the caster: guides 4 and 6 are exactly symmetrical with respect to plane C. In FIG. 2, yarn 3 follows a path which passes between the caster 1 and the two guides 4 and 6; there again, guides 4 and 6 are exactly symmetrical with respect to plane C, but they are slightly further away from the caster than in the embodiment of FIG. 1. In FIG. 3, the path of yarn 3 passes outside the guide 4 and between the caster and guide 6; the two guides 4 and 6 are not symmetrical with respect to plane C.

The device 12 for measuring the length of yarn absorbed per stitch has been installed on a flat knitting machine, equipped in particular on the path of the yarn 3 with a carriage 9 which inserts the yarn in the needles of the machine, with a yarn-return 10 which returns the yarn 3 at the end of stroke of the carriage 9, and with a tension device 11. The device for measuring the length of yarn is placed on the path of yarn 3 between the tension device 11 and the yarn-return 10. The gauge of the flat knitting machine is E 12; a plain ribbed knit has been made. The length of yarn absorbed per stitch is of the order of 6 mm with a yarn of count $33 \times 2$ tex.

In the arrangements of the three guides 4, 5 and 6 shown in FIG. 1, the caster 1 is speeded up in about 60 milliseconds, which corresponds to a displacement of 6 cm for the carriage 9 whose average speed is 1 meter per second. The measuring device 12 is adjusted so that the measurement of the length of yarn is effected beyond this path, for example by counting the electrical pulses emitted by the associated sensor only after a determined period of time corresponding to this phase of slip. This period being relatively short, thanks to the device of the invention, it is quite compatible with the knitting of panels of reduced width, for example panels for pullover sleeves of the order of 30 cm.

By way of comparison, a knit was made under the same conditions, changing only the device according to the invention. By eliminating the intermediate guide 5 for the same caster 1, it was impossible to knit more than 100 consecutive rows without encountering mishaps on the selvedge. With the device comprising the guide 5, no mishap was observed on the selvedge after more than 200,000 rows of stitches.

The embodiment which has just been described does not limit the invention. Although this device is particularly advantageous when it is mounted permanently on a flat knitting machine or any knitting machine with intermittent feed of the yarn, it is naturally also advantageous on any other textile machine with intermittent feed or permanent feed of the yarn. Similarly, it may form part of a mobile measuring device not mounted permanently on the machine.

I claim:

1. Improved device for measuring the length of yarn absorbed by a textile machine, comprising a rotating member driven by the yarn during displacement thereof, as well as three fixed guides over which the yarn passes, positioned near the rotating member so that the yarn is in contact with the rotating member along two substantially equal arcs of low value.

2. The device of claim 1, wherein each of the two arcs of contact is equal and included between 20° and 50°, and advantageously equal to 30°.

3. The device of claim 1, permanently mounted on a knitting machine with intermittent feed, between a tension device and a yarn-return which said knitting machine comprises.

* * * * *